United States Patent [19]

Ginn

[11] Patent Number: 4,802,115

[45] Date of Patent: Jan. 31, 1989

[54] MULTI-UNIT COMMUNICATING SYSTEM

[75] Inventor: Peter L. Ginn, Lake Jackson, Tex.

[73] Assignee: The Dow Chemical Company, Midland, Mich.

[21] Appl. No.: 734,995

[22] Filed: May 17, 1985

[51] Int. Cl.$^4$ .............................................. G06F 15/46
[52] U.S. Cl. .................................................... 364/900
[58] Field of Search ... 364/200 MS File, 900 MS File, 364/551, 481, 500

[56] References Cited

U.S. PATENT DOCUMENTS

| | | | |
|---|---|---|---|
| 4,027,289 | 5/1977 | Toman | 364/900 |
| 4,296,464 | 10/1981 | Woods et al. | 364/200 |
| 4,360,886 | 11/1982 | Kostas et al. | 364/551 |
| 4,517,637 | 5/1985 | Cassell | 364/551 |

Primary Examiner—Gareth D. Shaw
Assistant Examiner—Debra A. Chun

[57] ABSTRACT

A multi-unit data-collecting/information-generating-/instruction-passing/communication-network being a multiplicity of individual microprocessor systems capable of data-collection/presenatation/order-passing associated with instrumentation, process control elements and/or information displays, indicators and recorders on a two or three wire network programmed in a manner to enable (1) each individual information generating system comprised of one data measuring instrument generating a signal connected in juxta-position to an A/D and a microprocessor capable of converting analog signals from the instrumentation to digital signals then to serial digital strings and through a transceiver (T/R) transmit said digital serial strings onto the network, (2) each individual information-passing system comprised of a T/R-microprocessor-A/D juxta-positioned with a process control element, said system capable of recognizing an identifier code within a serial digital string containing instructions for said process control element associated with the system to cause said element to come to computer process control designated position said system tied into the network at said element site, and (3) each data-collecting system capable of receiving and converting selectively through T/R-microprocessor-A/D configuration an identifier code within a serial digital strings from said network, each microprocessor configuration capable of either developing process control element orders as information-passing strings, and transmitting them or providing readouts, visual displays, calculated process parameter changes, selected data storage, selected data printouts, and the like, all on a selective need to know basis at individual data-collecting sites remote from the instrumentation and control element sites.

3 Claims, 5 Drawing Sheets

MULTI-UNIT COMMUNICATING SYSTEM

BRIEF DESCRIPTION OF THE INVENTION

In accordance with the present invention, information (e.g. temperature, pressure, flow, condition of mechanical or electrical element, etc.) or instructions (e.g. up, down, left, right, faster, slower, more, less backup, forward, open, close, on, off, etc.) generated by a co-station or an intermediate station is transmitted onto a two or three wire network to be selectively "picked-off" by any station or stations as each station desires. By connecting the information signal generating instrument or the like to a microprocessor or microprocessors at the signal generator's site and passing the generated information, or a modified form computed by the microprocessor or microprocessors, in sequence with other similar information generated at other points on the signal communicating network, it becomes possible for listening stations which have within themselves a microprocessor and that are already on or can be connected to the signal communicating network, to selectively pick off information which that station has an interest in and such listening stations, by their function, can enable the information to be displayed visually, be recorded permanently or be used to calculate additional values for display, record, control or the like, of the operation from which the data signal is generated. No master station is necessary, each of the individual listening stations is responsible for picking off the information it requires to perform its function and/or carry out its function, readout, and/or communication. If desired an individual listening function can communicate onto the same two or three wire network within an ordered sequence a command to be picked up by those receiving or listening or operative stations having control function(s) only.

Thus, a process can be controlled, information displayed, information recorded, etc. with one or several inexpensive CPU's or microprocessors (also referred to by the abbreviation "$\mu P$") acquiring information selectively from a two or three wire network being fed information signals generated by a number of microprocessors on site attached to various instruments measuring physical properties, physical conditions, etc. The information is published by each microprocessor with an identifier in a time-identified sequence produced by the on site microprocessor's or microprocessor's/associated transmit/receive chip or chips. The instrument measurement is an analog value and it is converted to a digital value by an on site analog to digital converter. The variable's converted digital signal is input to a microprocessor on site at the instrument wherein one or more of several functions can be performed, the result identified and the identified results of this operation transmitted via the transmit/receive chip. The microprocessor recognizes the identification code of a predecessor data string or strings and causes the transmit/receive chip to transmit within an ordered time sequence the identification and element or elements of data onto the network either following immediately the passage of the immediate predecessor's data string or at a precise elapsed time should one or more of the strings normally preceeding be absent.

Since each microprocessor has but one source of data and it can be programmed to transmit through the transmit/receive chip such data it generates, many operations, calculations, comparisons etc. can be made and only those of significance need be transmitted. Similarly, a control element can receive only its signal picked up on site from the two or three wire network by its microprocessor and carry out its function. Of course, a second microprocessor may be located on site to return to the controller information of the control element.

Using a three wire network allows positive recognition of the zero or one sequence thus providing positive insurance for recognition of zero since it is not a null.

The present invention comprises a unique approach by providing process variable data to a network in engineering notation wherein individual subscribers to the network will receive all of the data but each subscriber selects any one or more of the published data as such subscriber desires, e.g. input to each subscriber's processor comprising only that data which concerns the recipient (subscriber) yet access to all the data is available. The unconventional aspect of the concept is generating in engineering notation the data for transmission in a time sequence to all of the subscribers, it being understood that each subscriber can select only so much of the data as that subscriber needs. This is accomplished by the employment of (1) an analog to digital converter (A/D) preferably capable of or containing A/D parts for converting any one of the three conventional forms of analog signals (e.g. emf, 3–5 psig, or 4–20 mA current) to digital signals; (2) an individual microprocessor ($\mu P$) and (3) a transmitter-receiver chip (T/RC). The uniqueness of the concept lies in the conversion of the usual analog signal at the site of the instrument generating the signal into a parallel digital signal, inputting the parallel digital signal into a microprocessor, again at the site or in close proximity to the site of the instrument, and, outputting in serial digital strings data in engineering notation onto the network.

The microprocessor should be capable of one or more of the following functions storing the raw signal comparing the raw signal to a standard, mean and/or previously stored raw mean or standard signal, develop an average, change from last, deviation and/or direction of change, debounced value, median or average value, all within a time frame, and, further be capable of (1) adding an identifier and (2) communicating any one or more of said programmed results as a digital value and a digital identifier to a transmitter/receiver chip. The latter puts onto the network the value and the identifier as a string of serial digital signals following the passing of the predecessor signal identified by code and message and/or on a time lapse sequence from the last transmission on the network.

Similarly of course, command signals from controller stations are sent to controller elements, either on a separate three wire network dedicated to control or in timed sequence within the reporting instrument sequences on the same three wire network. The advantage of this system is a simple three wire network over which serial digital strings are transmitted reducing the complexity of the wiring and the interference to signal transmission. Further, the advantages are:

Power and intelligence is spread around the plant, no central source of back-up power is needed;

One network serves to communicate both measurements and command instructions;

Redundancy and error message checking is not part of the network protocol (therefore as little or as much can be added according to each subscriber's needs);

No limit to the number of subscribers;

Failure of part of the network need not be total catastrophic failure of the complete network;

Serial digital nature of the message strings allows different means of communication to mix (millivolts and fibre optics) within one network (no continuous electrical connections are needed); and, More than one network can be in a plant complex, subscribers can suscribe to more than one network.

No interference from electrical and/or magnetic fields of communication because signal is digital string.

The present invention comprises utilizing elements of the computer age in a unique manner to develop a data transmitting network into which data is input in an identified form in serial digital strings in ordered time programmed sequences and this data is selectively taken off the network by stations whose data needs are less than the whole being transmitted. For example, in a chemical process, pressure is usually a reaction parameter and the value of the pressure is usually presented at a control point for visual observation. The same value may be needed to effectuate control based on a preprogrammed maximum/minimum value correlated with temperature, flow rates, product purity etc. The visual projection of the pressure can be accomplished by programming a simple microprocessor to recognize the identity of the pressure measuring signal transmitted on the three wire communicating network and merely put the signal received into a microprocessor on the control board in a multiple digit readout, for example. While a more sophisticated CPU may pick the pressure signal from the network to project a visual readout it may also use it in programmed calculations employing, for example, the temperature signal, the flow rate signals and/or the analytical data on the product stream or other streams to control the process and/or report a calculated result. Several simple CPU's, microprocessors etc. can pick off from the network the desired data and use their capabilities to produce desired information in the most advantageous format.

The concepts here disclosed can be used in data collecting systems for chemical processes, for automotive or aircraft operation, safety and/or control, industrial machinery operations and the like as well as for control of the operation from which the information or data signal was generated.

The concept eliminates the conventional several multi-wire cables and harnesses usually associated with transmission of data from instruments to central computer processing units. In addition, inexpensive elements and less sophisticated CPU's can be used, reducing capital expenditures, maintenance costs, and making repairs simple by merely replacing chips at the instrument site.

Further, rather than having all signals received by a main frame and time consumed for storing, retrieval publishing and calculating smaller CPU's can be used advantageously reporting etc. data more timely as well as reduce the cost by eliminating the more expensive main frame.

IN THE DRAWINGS

DETAILED DESCRIPTION OF THE INVENTION

Figure 1:
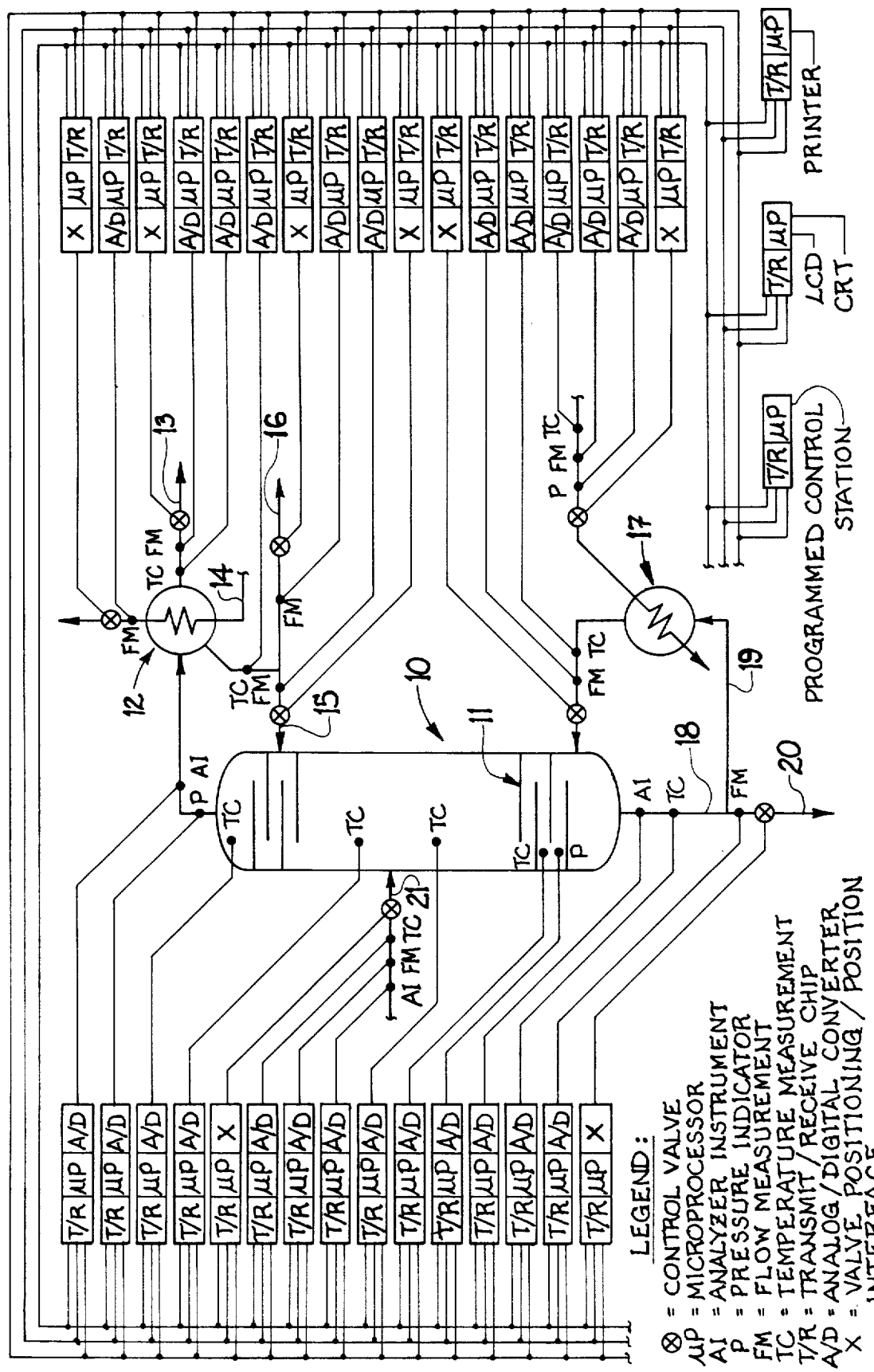
FIG. 1 illustrates in schematic form an application of the present invention in a unit operation, a distillation column.

In accordance with one embodiment of the present invention a process variable measuring instrument, e.g. a peizoelectric crystal capable of generating an analog signal as a measurement of pressure was connected directly to a microprocessor having an analog to digital (A/D) converter constructed to convert the analog signal to a digital signal. Usually, the microprocessor has an A/D package suitable for converting emf, current, and/or pressure analog signals to digital values. Of course only one converter element is employed per microprocessor, the others being destroyed or merely not used. The inclusion of all three types of A/D converters to the microprocessor eliminates the need for service personnel to carry three different sets of replacement entities one each for emf, current and pressure conversions.

The microprocessor, as most microprocessors, operates on digital values and is programmed to perform several functions, to wit: produce an identifier for itself thus identifying, by including in the digital string, the identity of the instrument it serves; carry out one or more calculations, as programmed, to store data, generate comparisons of the value to previous values, generate averages, means, change from last, direction of change, etc. all within a time frame. The microprocessor is also programmed to pass its data to the transmit/-receive chip (T/RC) at the output port. The microprocessor is programmed to receive from the transmit/-receive chip all messages on the network and so recognize its broadcast placement within a multi-instrument network by recognizing a predecessor identifier on the network. The microprocessor is also programmed to broadcast in a time ordered sequence from the last received broadcast in the network, should it happen that the preceding message is not broadcast even though it is two or three or more predecessor signals which have not broadcast.

The network is preferably a three wire/conductor cable: the one (of two wires) and the third (or common) wire being used to transmit the binary element zero, and the other (of the two wires) and the third (or common) wire being used to transmit the binary element one. The three wire network is biased to insure that errors are recognized. Thus, if both of the two wires are shorted out nothing is being transmitted, if both of the two wires have an impressed voltage there is an error (a malfunction somewhere), if the one of the two wires has impressed across it a voltage and the other of the two wires has not, it is a 'zero', and if the other of the two wires has impressed across it a voltage and the one of the two wires has not, it is a 'one'.

Each receiving station (having no ID unless it is also probgrammed to generate a signal such as a control command on the network is programmed to receive only that data it is interested in displaying, calculating or comparing. Each receiving station can select the data it desires. There is no need for a master station into which all data is received, stored and then rebroadcast to other stations, printer readouts and the like.

The advantage of the hereinbefore described system is that simple inexpensive microprocessors are located at the site of the data collector or actuator, their signals converted to computer usable signals and these digital signals transmitted per se or calculated results therefrom transmitted in a time ordered sequence on a three wire communications loop to minicomputers and/or microprocessors whose function is to do only a single operation (operate a LED or a multiple seven segment display) or a few operations, store, summarize, calculate, tabulate, display and/or command. Additional benefits are derived from the fact that several microprocessors can be hung on a single instrument each to do a different operation on the signal the instrument generates.

Similarly, if more calculations are desired from the data or more data is needed at a particular receiving station or even to access already implemented data, a program change can be made or a second or third microprocessor or minicomputer can be added, just by connecting three wires from the network to the CPU input and preprogramming the CPU, all without interruption of the existing CPU's or microprocessors and without interruption to the signal transmitting instrumentation. Simmilarily, if many receiving stations need more data from a signal generating point, an instrument need merely be connected to an additional A/D; $\mu$P-T/RC assembly and the $\mu$P programmed to generate the additional data and report it sequentially at its due time to all receiving stations.

In addition should one data generating microprocessor fail, others attached to the same instrument making other calculations may be able to provide sufficient information to carry on until the non operating or erroneously operating processor is replaced.

In a representative example of the appreciation of the present invention reference is had to the drawing, FIG. 1, which represents in schematic diagram a temperature, pressure, flow measuring instrumentation of a distillation column.

In the drawings, FIG. 1 illustrates a distillation column (10) which has a number of trays (11), a reflux condensor (12) provided with a vapor outlet (13) and a condensate outlet (14). The condensate outlet (14) is split into two streams, a recycle stream (15) and a product stream (16). The column is also provided with a reboiler (17) heated with steam. The heavy products are removed at heavies outlet (18) which is split into a recycle stream (19) returning that portion through the reboiler (17) to the column (10). The remainder of the stream is removed from the system through line (20). The feed (21) enters about midway up the tower.

It is usual practice to place temperature, pressure, flow and analytical instrumentation throughout the column, condensor and reflux piping. In the drawings, "TC" represents a thermocouple, "P" represents a pressure sensing device, "FM" represents a flow meter and "AI" represents an analytical instrument. Each instrument illustrated in the drawings produces an analog signal. For example, a thermocouple usually generates an emf, a pressure measuring device either a fluid pressure or a peizoelectric current and a flow meter produces either a current or an emf. These signals are converted in accordance with the present invention into digital signals by means of the analog/digital converter indicated as A/D in the drawing. The configuration of which, with respect to the instruments and other computer element auxiliaries is more clearly shown in FIG. 2. The A/D is connected to a microprocessor ($\mu$P) which adds an identifier and also carries out preprogrammed functions, such as from merely putting the instrument signal into a form to be suitable to provide a liquid crystal display readout in degrees Fahrenheit or centigrade, pressure in millimeters, pounds per square inch, etc. to comparing the instrument reading with a past reading, calculating the rate of change, direction of change etc. The product of the $\mu$P's effort is in preprogrammed time sequence transmitted via the transmit receiver chip (T/R). This T/R also receives each message or serial digital string, passing it to the $\mu$P. The $\mu$P recognizes the ID portion of such strings and ignores such or transmits in turn its string as programmed. As afore explained the $\mu$P is also programmed to deliver its output in a time lapse sequence if no messages are received within a designated time frame because each unit on the system is time oriented to a fixed string length and consequently has a fixed time to transmit.

Figure 2:
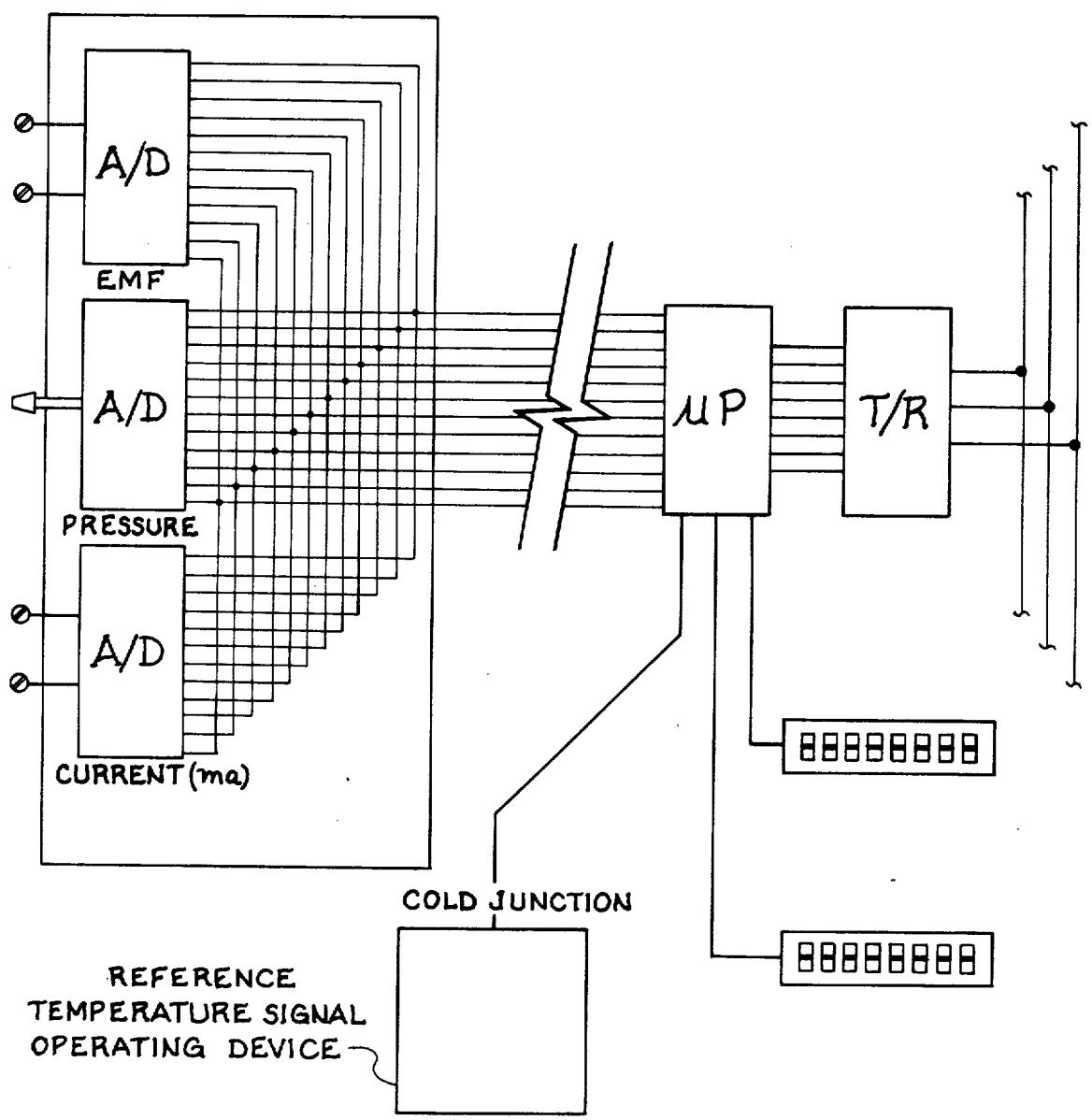
FIG. 2 illustrates in detailed schematic form the use of a three element A/D with representative instrumentation input which can be connected to such three element A/D (of course only one instrument per A/D)

The elements A/D, $\mu$P and T/R are more clearly shown in FIG. 2. A multi element A/D is shown with three elemtns, one each for emf signal conversion, pressure signal conversion and current signal conversion, to a parallel digital signal. Only one element is used per $\mu$P. The A/D is wired to the $\mu$P which is programmable. At the output of the $\mu$P is wired a transmit/receive (T/R) chip which in turn connects to the two or three wire network.

Figure 5:
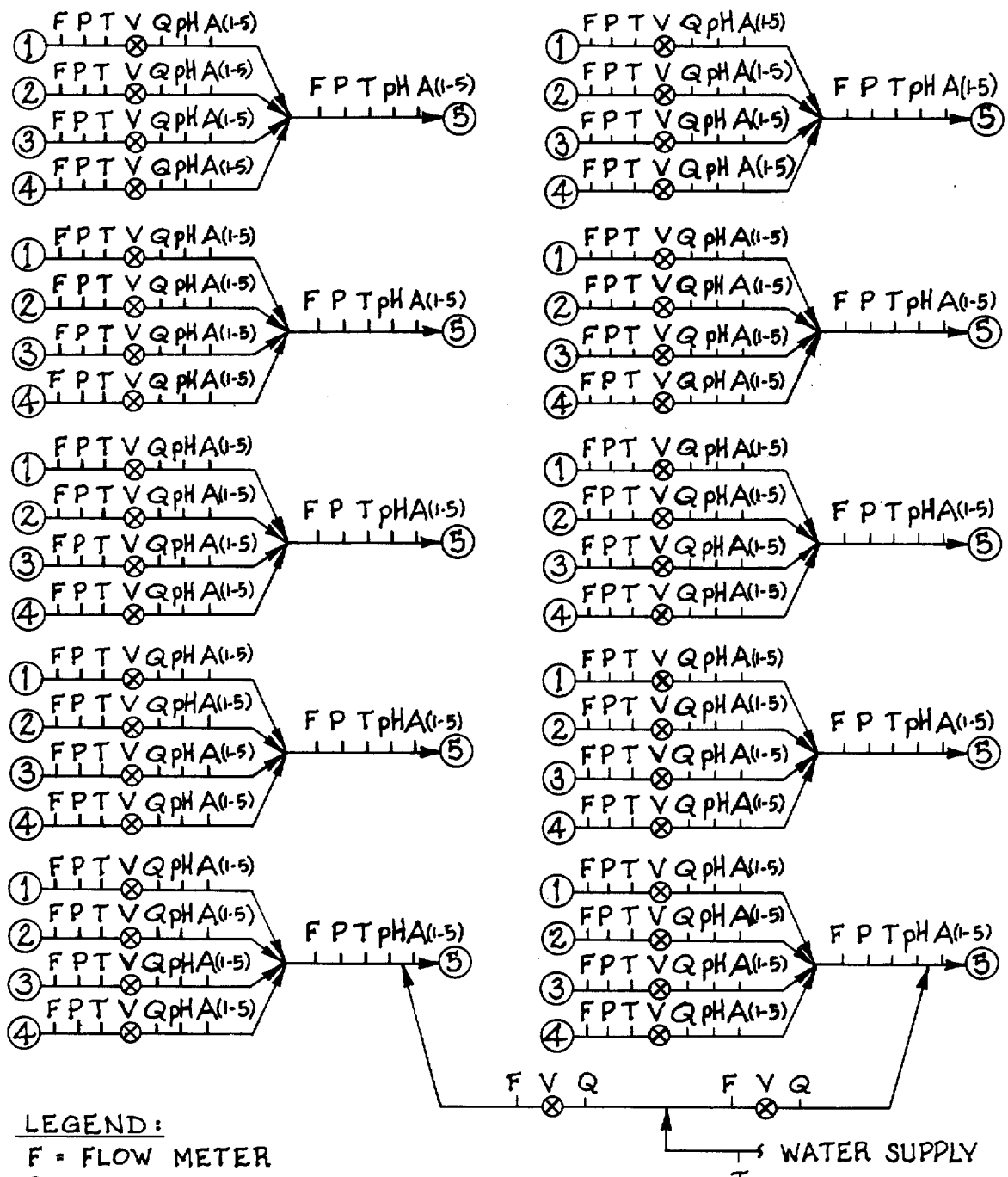
FIG. 5 represents in schematic plan a more complicated application of the technology of the present invention to a multi-stream mixing operation.

For the purposes of further illustration to demonstrate the potential of the invention we have chosen to send the information in four data bytes of eight bits, thus each transmission from each element will be thirty two bits plus the associated start and stop bits. In the example illustrated in FIG. 1, a very simple illustration of application of the present invention one can obtain readings from the 22 instruments and order the 8 valves to operate. It is apparent that this sytem is only making use of a small percentage of the capability of say a 9600 BAUD $\mu$P system, where for example we assign thirty two bits (4 bytes) to each instrument for ID and data. Since only 40 publications/orders are required we could update the data to form each instrument and order the valve positions 6 times per second. If such is done of course much redundancy would occur. The system illustrated having thirty-two elements will transmit an entire cycle of data every 0.167 seconds at a Baud rate of 9600. Thus, it can be seen that, since data from most processes is certainly not neded more than once a second and for some processes even once a minute is quite sufficient, it is easy to have some 240 data broadcasting elements (at 4 bytes each at 9600 BAUD), far more than usually found in an entire train of a chemical reaction, carried on a single network each station reporting once a second. Again if the data needs to be updated only once every 5 minutes, upwards of 65,000 stations will transmit 4 bytes of data each within the scheme of things. The significance of such flexibility is that data needed only once every five minutes can be programmed in among the more often required data. For example a system operating with 4 byte strings at 9600 BAUD accomodates a complex system of stream mixing. In diagram (FIG. 5) each of the 10 product streams is a mix of four component streams, except for two to which extra water is added. Each of the component and product streams is measured for flow, pressure, temperature, pH, and has five constituents analysed. Further the component streams are controlled with control valves, one in each stream. Each control valve uses two codes: one to report its position and one to accept instructions to change its position. The two water streams report their flows and valve positions and each accepts positioning instructions. The temperature of the water is reported once.

Consequently, the information available:
2 water streams reporting 2 flows, 2 valve positions, 1 temp.=5,
40 component streams, reporting flow, pressure, temp., valve position=160,
10 product streams, reporting flow, pressure, temperature=30,
42 valve position commands=42,
50 pH's=50,
50 complete analyses comprising 5 sub-analyses each=250.

However, not all this information is both fresh and relevant once a second. Some of the information can be reported much less frequently. Accordingly, each pH meter reports its value once every 25 seconds and each analyzer makes a complete report once every 4 minutes and 10 seconds. This is a little longer than the time each analyzer requires to perform a complete cycle of preparation, sampling and analysis. This saves much redundancy in reporting analytical results.

Therefore in the total system 237 codes are for information broadcast fresh every second; the flows, value positions, pressures, temperatures of the component streams, the product streams, and water streams plus the valve position commands. For the once a second data the string is comprised: first byte reporting code and second, third, fourth bytes measurement.

A further two codes are reserved for the pH probes, 25 of which report under each code, one probe per code each second, so that each individual pH probe broadcasts its value once every 25 seconds. For these the string is comprised: first byte one of the two pH reporting codes, second byte the particular pH probe in this subgroup of 25, third and fourth bytes measurement.

Finally, one code is reserved for the analyzers all of which report under that one code, but taking it in turn in strict rotation to broadcast each time that slot becomes available which analyzer, which sub-analysis and the particular analysis. There are 250 analyses to report therefore each individual analysis will be broadcast once every 4 minutes and ten seconds. The analysis string comprises: first byte, the analyses reporting code, second byte the identification code for the particular analysis of the particular analyzer, and the third and fourth bytes and actual analysis itself.

It can be seen from this example that the 240 reporting codes can be interleaved with sub-group codes and such a technique enables 537 pieces of information to be broadcast within the nominally 240 code system, some data fresh every second, some data reported only once every four minutes or so.

Figure 3:
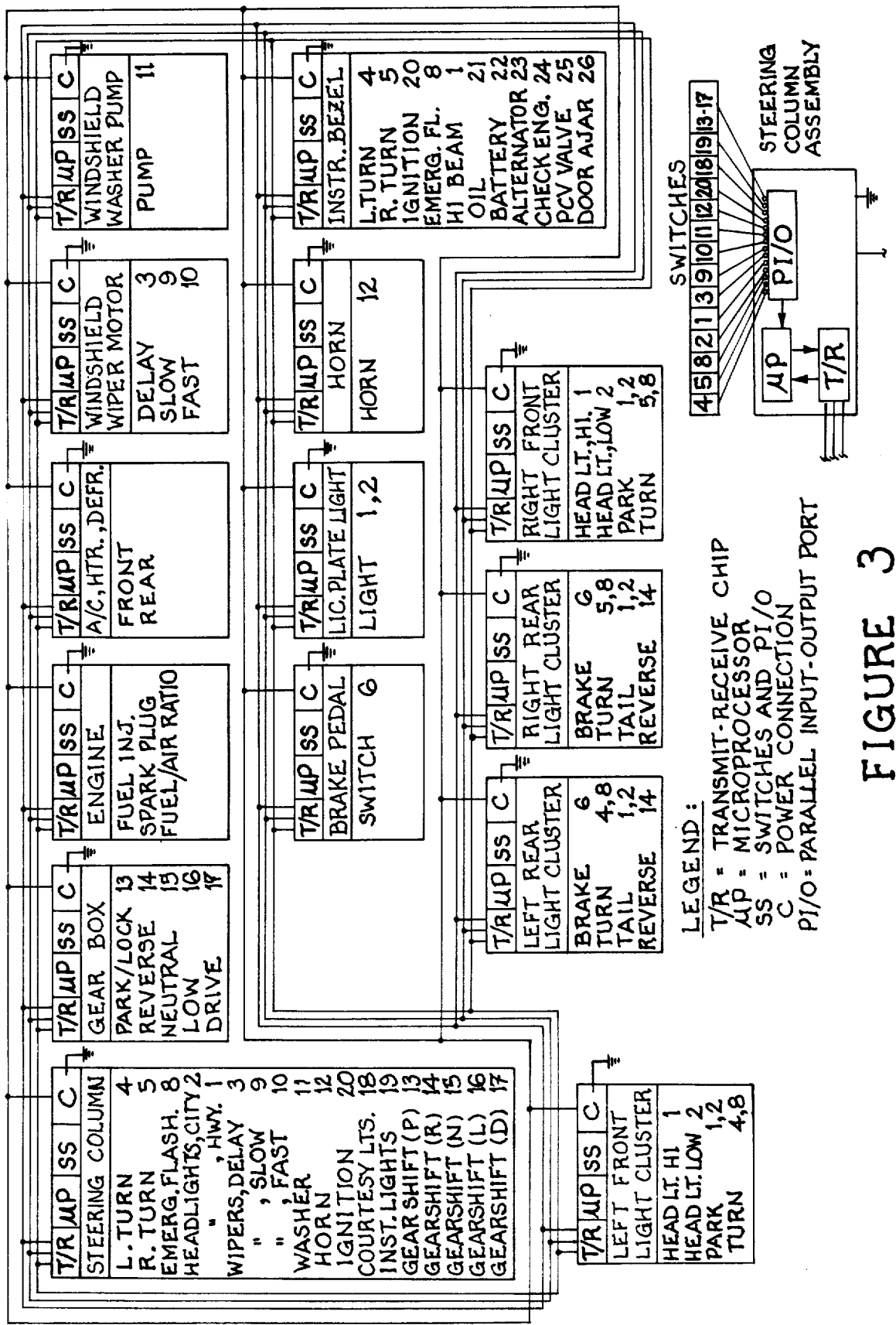
FIG. 3 illustrates in line notation the various elements of an automobile which can be operated via the three wire system and the associated microprocessors and their peripherals of the present invention.

In accordance with another embodiment of the present invention the safety sensors, the accessory operating mechanisms, and the like for motor vehicles, etc., can be modified by incorporating a microprocessor (of the present invention) at the sensors or operating switches and having these microprocessors connected to a three wire cable passing through readout microprocessor LCD stations, and operating switches such as turn indicators, lights etc. Such a system is illustrated schematically in FIG. 3.

In such an application of the concept of the present invention the installation of the microprocessor system in an automobile to operate the electrical system and telemetering system, simplifies the wiring a and provides, by a 360° circuit of both the electrical system and telemetering system, a substantial fail safe circuitry. Such an application is diagramatically illustrated in FIG. 3. In the drawing conventional elements of an automobile electrical system, ignition, head lights/tail lights/turn signal lights, heating/cooling system, engine controls, brake lights etc. are illustrated within the boxes which represent clusters of these elements as is presently recognized in modern day automobiles. The controls for these elements are likewise shown in clusters, e.g. steering column levers, switches and buttons. As illustrated each element of the automobile electrical system identified is provided with a transmit/receive chip (T/R) a microprocessor ($\mu P$), a parallel output device capable of activating several solenoids, and a source of power through each solenoid to the element (light bulb, etc). The various operator activated mechanical switches (ignition, turn indicator, headlight switch etc.) also have a T/R chip, a $\mu P$, and a parallel input device capable of sensing the energized/de-energized state of several switches and a power source to the $\mu P$. The $\mu P$'s are connected through T/Rs to a three wire circuit, each $\mu P$ of which is further wired to individual switching elements normally located in the steering column. Thus, the turn indicator lever with its left on/center off/right on switch is electrically connected via two small line voltage wires to two digital input terminals which connect through a parallel input-/output interface to the $\mu P$ itself.

The novel wire configuration of a single loop of power cable which can either directly connect to the switch (e.g. solenoid) designated "SS" in the diagram or through a pig-tail combined with the three wire computer communicator system will eliminate the multi wire harness used conventionally.

The unique system employs a single microprocessor at each cluster, although it is to be understood that a small microprocessor may be used at each element. In accordance with the present invention the light clusters (front right, front left, rear right and rear left) may each be operated by a microprocessor programmed to receive and recognize signals from the steering column command module switches for each element of each cluster. The microprocessor programmed to recognize and receive signals from the steering column command module to activate power to various elements, e.g. the tail light when the command switch is operated, activate power to the back-up light when the transmission is placed in the reverse mode or activate power to the brake lights when the brake pedal is depressed. In addition, the microprocessor will recognize the signal to operate the left turn light and the emergency flasher lights when these switches are operated at the command module whether or not the ignition is on. Alternatively, each element may have a small microprocessor which receives identified command functions for that element e.g. left rear tail light right stop light etc., and being placed on each element of each cluster it will follow only its element's operational instructions.

In the embodiment illustrated a multi responsibility microprocessor is located with each cluster where convenient, as on the steering column, the brake pedal, the engine, the heating and cooling controls, instrument bezel group and the like. Each cluster is comprised of a parallel input/output port which contains sufficient bit capability to accept a scan of each switch in its cluster, a microprocessor ($\mu$P) programmed to scan the parallel I/O port (PI/O) and thus the switches in its cluster, identify the switch's position, and output this by developing the switch identity coupled with its status, on or off, and transmit this identity/status through a transmit/receive chip (T/R) onto the three wire network. The message is received at the T/R unit of each other cluster $\mu$P or element $\mu$P and as each cluster $\mu$P or element $\mu$P is programmed to discriminate for its signal; all signals pass into the $\mu$P for processing and when the proper message is received, e.g. operate left turn then those $\mu$P's programmed to act on this message will operate the left turn indicators front and rear and the light bezel on the dash. Each such programmed $\mu$P does this by causing a signal to go out through its PI/O to an appropriate switch within the light cluster connecting for instance the left turn light to the power source thus energizing the light.

In more detail:

Consider a left turn:

Firstly, let us assume we have assigned the left turn indicator a number 36, that our system has 96 elements, and the transmission rate is 9600 BAUD. This will give a system rate of 10 cycles per second. In binary notation the left turn indicator ID will be

0100100.

We have assigned 10 bits in each message element. The first and last bits are the start and stop codes, 0 being assigned for start and 1 being assigned for stop. A single bit of 0 or 1 is assigned as the on or off command. Thus seven bits are used to encode the 96 element identifiers. The entire digital string for the left turn "on" command will read 0 0100100 1 1.

Thus, when the left turn lever is depressed, indicating a desired to activate the left turn signal lights, the switch on the column energizes the console microprocessor which will encode the above message onto the network at the correct time for receipt by the microprocessors at the left turn signal light clusters. The correct time will be immediately after element 35 has broadcast or if no signal 35 has been broadcast but if 0.00104 seconds have elapsed from the broadcast of element 34 or 0.00104 times the number of elements less than 36 which have not broadcast on this cycle. This message is broadcast to all elements of the circuit and the front and rear light cluster microprocessors on the left side recognize it as an order or command to activate the filaments of the turn signal lamps at the correct rate of blinking. The message sequence repeats itself 10 times a second until the turn lever is centered to the off position whereupon the light cluster begins to receive a new message 0 0100100 0 1 which signifies the turn lever has been moved away from the left activation position and that power is no longer required at the left turn light cluster. This message continues to be broadcast, 10 times per second, until either turn lever is activated.

Figure 4:
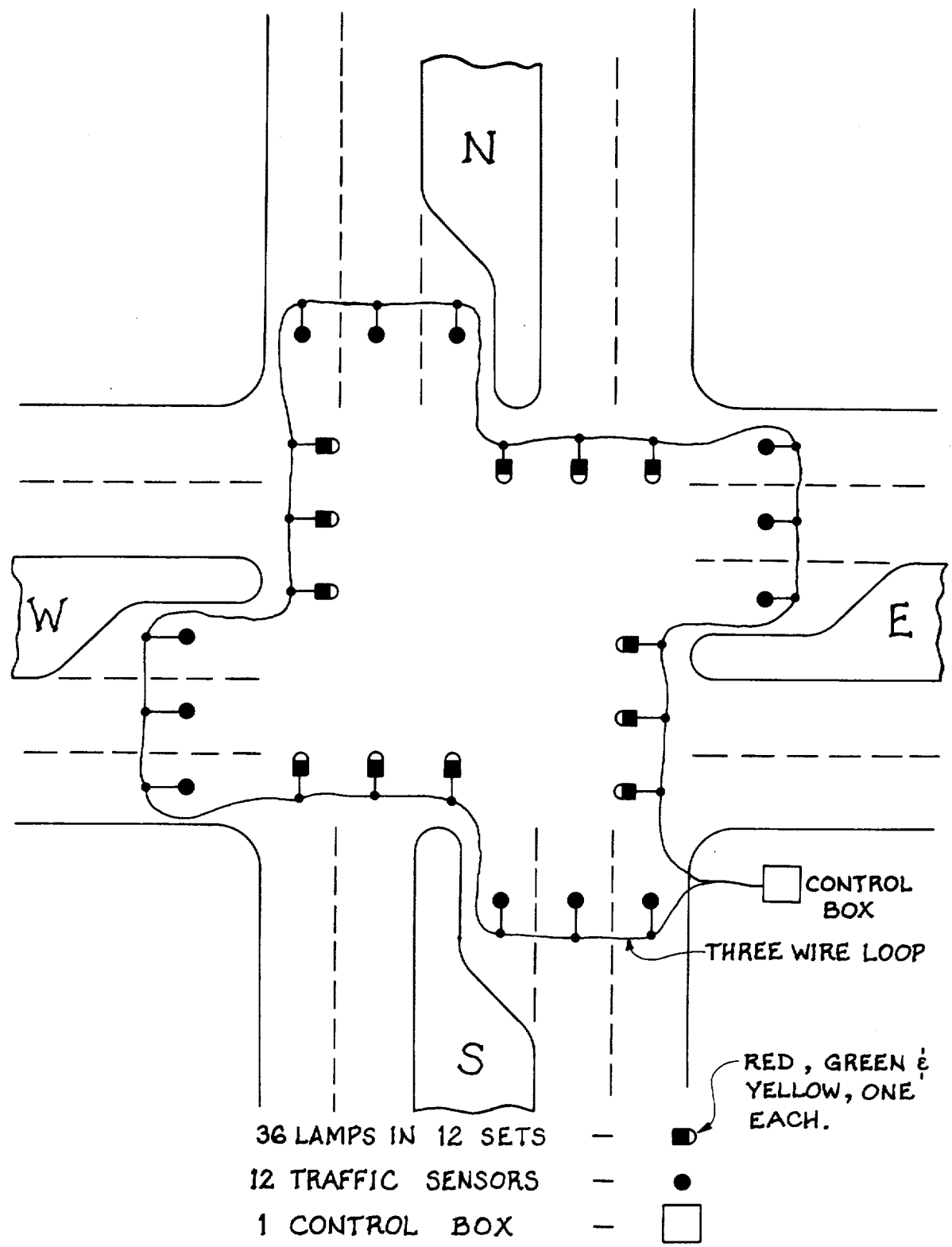
FIG. 4 represents a schematic plan of a vehicle intersection with traffic lights to control traffic flow.

Consider a set of traffic signals:

The present invention can afford considerable simplification in the operation and maintainance of traffic signals. The drawings, FIG. 4 shows a large intersection with twelve sets of three lamp traffic signals (36 lamps total) and twelve traffic sensors installed in the pavement. A "ring" style power cable is used to supply the power to all the lamps. This invention permits the running of just one twisted triad signal cable in a ring fashion, to connect all the lamps and the sensors to the control box, with a single triad termination at the control box. In this example a 7 bit identification code and a 1 bit data code will be used. The 7 bit identification code allows up to 128 stations in the ring. The assignments are:

| 36 codes | 36 lamps | 1 OK, 0 lamp burnt out |
| 36 codes | 36 lamps | 1 lamp on, 0 lamp off |
| 12 codes | 12 sensors | 1 vehicle, 0 no vehicle |

Thus, there are 84 codes used out of 128. If the triad cable had a transmission rate of 9600 BAUD each lamp would report its condition 10 times a second. The lamps could be turned on and off in tenth second increments, and, the sensors could report up to 10 vehicles a second. Certainly that is more than sufficient for the task at hand. In operation, the control box would receive the vehicular count from the sensors and would transmit the on/off instructions to each lamp as the traffic flow and the preprogrammed logic determined. Each lamp would listen for its particular code and data bit and turn itself on or off as the data bit instructed. The control box would be aware of which lamps were servicable and which were not. With a suitable arrangement the control box could call such information (as well as a census) into a central control.

It also becomes feasible for a single inexpensive microprocessor to link together and control a series of intersections, each controlled by traffic lights, thereby providing smoother flow for the traffic passing through these lights.

I claim:

1. A process control system which comprises
   (a) a two or three wire network having connected thereto
   (b) a plurality of process control elements, each associated with and in juxta-position with
   (c) a position altering element capable of receiving and responding to an analog signal from an associated juxta-positioned D/A, which position altering element moves the process control element, said D/A is further associated with
   (d) a juxta-positioned microprocessor associated with
   (e) a juxta-positioned transceiver (T/R) said transceiver (T/R) connected to the network,
   said microprocessor capable of recognizing an identifier within a serial digital string for a code that would identify the particular process control element with which the microprocessor is associated (f) a plurality of instruments including element position indicators each capable of measuring a process variable or process control element position each generating an analog signal and each associated with an having in juxta-position therewith an analog to digital converter (A/D) for converting said instrument analog signal into a digital signal value, (g) a separate pre-programmed microprocessor associated with each A/D for conversion into engineering notation of the said digital signal and for inclusion of at least an identification code for said measuring instrument or process control element (h) a transceiver (T/R) associated with each said microprocessor and connected to said network for conversion of said engineering notation and associated identification code into a serial digital string for transmission onto the network, said microprocessor transceiver combination also capable of recognizing the identifiers of other microprocessor transceiver combinations on said network thus enabling it to transmit its serial digital string in proper sequence onto the network, each instrument microprocessor-transceiver combination transmitting its identification/engineering notation as a serial digital string in an ordered sequence derived from the identification itself, said network also including (i) a plurality of microprocessors capable of performing at least one of the tasks of storing, visual readout, calculating process parameters from the received signals from selected instruments and/or ordering changes to said process control elements anyone or all of which microprocessors are remote from said instrumentation and/or said process control elements.

2. The process control system of claim 1 in which said analog value transmitted by an instrument, converted to digital value, received by a microprocessor or microprocessors on site of said instrument is processed by said microprocessor which is programmed to store such signal and/or compare such signal with a norm or with previous stored signal or signals, and/or develop one or more of an average, change from last, deviation, direction, debounced value, and/or median, with or without a time frame and communicate such pre-programmed computation or computations to the network, via said T/R.

3. In a process for controlling a system being a two or three wire network having connected thereto a plurality of process control elements, each associated with a position altering element capable of responding to an analog signal converted from a digital signal juxta-positioned digital/analog converter (D/A) associated with each element which D/A is associated with a juxta-positioned microprocessor and a transceiver (T/R) connected to the network, the combination capable of recognizing a serial digital signal code identified for the element with which they are associated a plurality of information-generating instruments, including element position indicators, each capable of measuring a process variable or process control element position and generating an analog signal, a plurality of combinations associated and juxta-positioned to each such information-generating instrument consisting of an analog to digital converter (A/D) associated with each such instrument for converting said instrument analog signal into a digital signal value, a separate microprocessor associated with each A/D programmed to at least convert into engineering notation said digital signal and include an identification code for said measuring instrument a T/R port associated with each said microprocessor for conversion and transmission of said engineering notation and identification code generated within said microprocessor into a serial digital string for transmission onto the network, and a plurality of data-collecting microprocessors capable of performing at least one of the tasks of storing, visual readout, printing, calculating process parameters from the received signals from selected instruments and/or ordering changes to said process control elements, which process comprises generating an analog signal within each process variable measuring instrument;

converting each said analog signal into a digital signal value in said juxta-positioned A/D associated with said instrument, inputting said digital value into the microprocessor associated with said A/D, which microprocessor is programmed to at least (1) add an identifier code identifying said instrument and said value of said measurement;

(2) develop a significant result not attainable by the single measurement alone;

(3) broadcast in sequence said identity code/result from the associated T/R port of said microprocessor as a serial digital string at an assigned time prompted by the identification code, onto the three wire network, receiving at any data-collecting site with access to the network, remote or in close proximity, serial digital strings therefrom selected by said receiving station according to those identifications of interest which microprocessor is programmed to perform a designated task, and transmitting onto said network from at least one of said data-collecting site(s) serial digital strings identifiable as process control element instructions, thereby to adjust said process control elements to maintain the process under control.

* * * * *